United States Patent
Saraceno, Jr.

[11] Patent Number: 6,012,685
[45] Date of Patent: Jan. 11, 2000

[54] ELECTRICAL WIRE POSITIONING

[76] Inventor: Eugene A. Saraceno, Jr., 12 Jefferson Ave., Watertown, Mass. 02172

[21] Appl. No.: 08/115,187

[22] Filed: Aug. 31, 1993

[51] Int. Cl.[7] .................................................. F16L 3/22
[52] U.S. Cl. .......................................... 248/68.1; 52/520.8
[58] Field of Search ............................. 248/68.1, 71, 906, 248/216.4, 216.1, 300; 52/220.8, 74.1, 745.05, 745.09, 745.13, 745.1; 33/DIG. 10, 528

[56] References Cited

U.S. PATENT DOCUMENTS

| | | |
|---|---|---|
| D. 293,203 | 12/1987 | Hertensteiner . |
| 1,219,746 | 3/1917 | Keppler ................................ 248/216 X |
| 1,930,928 | 10/1933 | Dunlop, Sr. ........................... 248/906 X |
| 2,023,083 | 12/1935 | Knell ..................................... 248/906 X |
| 2,047,294 | 6/1936 | Simek ................................... 248/906 X |
| 2,051,639 | 8/1936 | Kalmbacker . |
| 2,867,681 | 1/1959 | Huchnel ............................... 248/68.1 X |
| 2,917,263 | 12/1959 | Appleton et al. .................... 248/216 X |
| 3,334,416 | 8/1967 | York . |
| 3,718,307 | 2/1973 | Albanese . |
| 4,212,110 | 7/1980 | Hill, Jr. ..................................... 33/528 |
| 4,345,381 | 8/1982 | Brisbin ..................................... 33/528 |
| 4,422,708 | 12/1983 | Birnholz ................................ 74/138 G |
| 4,550,451 | 11/1985 | Hubbard .............................. 248/68.1 X |
| 4,643,379 | 2/1987 | Potocnik . |
| 4,907,766 | 3/1990 | Rinderer . |
| 4,909,461 | 3/1990 | Collins . |
| 4,957,251 | 9/1990 | Hubbard ................................. 248/68.1 |
| 5,060,892 | 10/1991 | Dougherty . |
| 5,133,094 | 7/1992 | Clarke, Jr. ............................. 248/68.1 |
| 5,157,844 | 10/1992 | Mallison et al. ......................... 33/528 |
| 5,195,249 | 3/1993 | Jackson ..................................... 33/528 |
| 5,491,902 | 2/1996 | Uhrin et al. ........................... 33/528 X |

*Primary Examiner*—Ramon O. Ramirez
*Attorney, Agent, or Firm*—Fish & Richardson P.C.

[57] ABSTRACT

A wire positioning support bracket is for positioning electrical wiring during installation. The support bracket includes an elongated strip of electrically insulating material having mounting surfaces at opposite ends for attachment to wall support elements, and is formed with an array of wiring apertures spaced along its length.

5 Claims, 2 Drawing Sheets

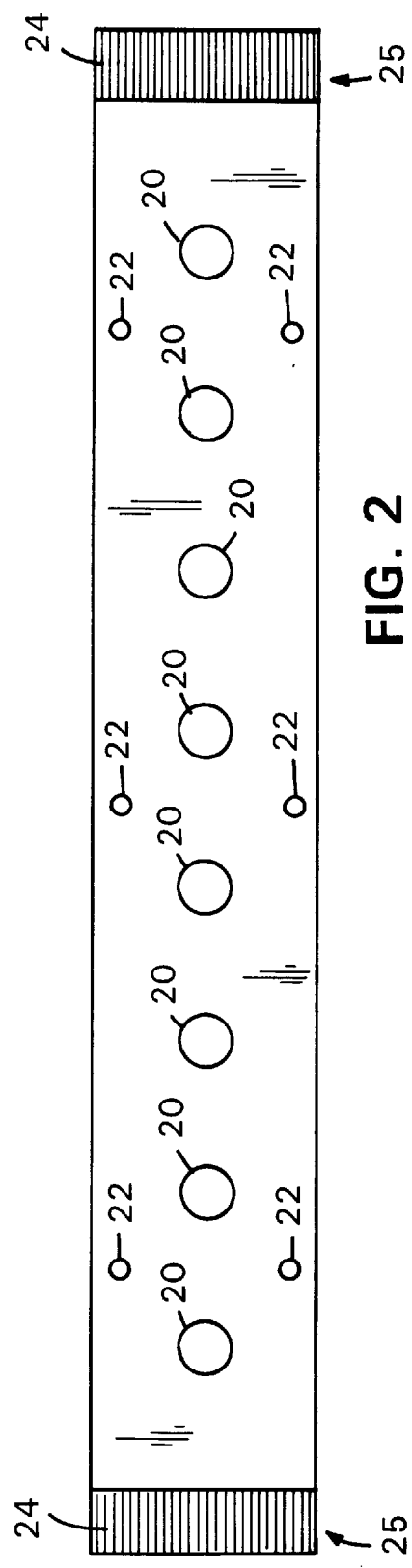
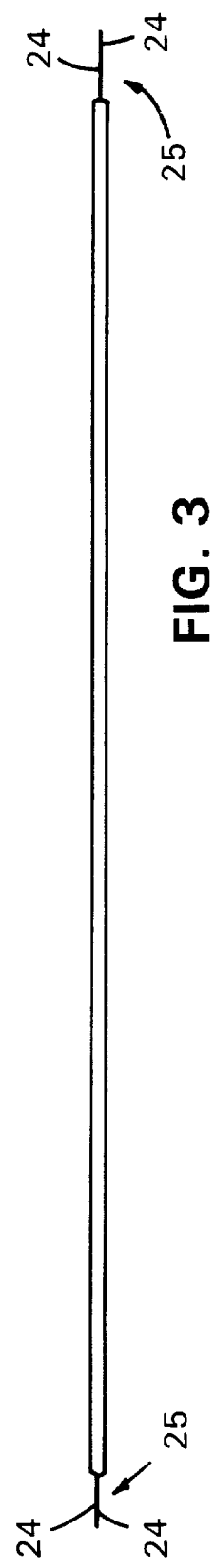

ELECTRICAL WIRE POSITIONING

The invention relates to wire positioning support brackets for electrical wiring installation.

When a building is being constructed, or a room therein is being renovated, the vertical structural elements (studs) which support the walls are exposed. Electrical wiring is routed to a region between consecutive studs where an electrical outlet or fixture is to be located. When the walls are attached to the studs, openings are cut in the wall material to accept the desired outlet or fixture.

Often an outlet or switch box is fastened to the side of studs, wires enter the box for connection to a switch, power or telephone receptacle or other device usually installed after the wall covers the studs after being formed with openings exposing the boxes.

However, there are many occasions when a wire is to be connected without a box, such as to a thermostat or a vanity light over the sink, the light having a center knockout on it. To locate the wire, an exact measurement off the floor and directly in the center of the sink is difficult. Typically, sheetrock covers the studs, and sheetrock workers are not responsible for location of the wire. They typically make a cutout wherever the wire appears.

A search of the prior art in subclasses 49, 57 and 68.1 of class 248 uncovered the following patents:

| | |
|---|---|
| Des. 293,203 | Hertensteiner |
| U.S. Pat. No. 2,051,639 | Kalmbacker |
| U.S. Pat. No. 3,334,461 | York |
| U.S. Pat. No. 3,718,307 | Albanese |
| U.S. Pat. No. 4,643,379 | Potocnik |
| U.S. Pat. No. 4,907,766 | Rinderer |
| U.S. Pat. No. 4,909,461 | Collins |
| U.S. Pat. No. 5,060,892 | Dougherty |

According to the invention, a wire positioning support bracket for electrical wiring installation includes an elongated strip of electrically insulating material, mounting surfaces at the ends of the strip by which the strip is attached to wall support structures, and wire apertures spaced along the strip.

The mounting surfaces are typically spaced apart by the same distance as the support structures to which the support bracket is to be attached. The mounting surfaces are preferably striated to provide improved "grip" into the support structures. The wiring apertures may be provided in two sets, with one set located along the longitudinal axis of the support bracket and the other set located above and below the longitudinal axis.

The apertures may be of different diameters to accommodate different wire sizes.

Other features, objects, and advantages will become apparent from the following detailed description when read in connection with the accompanying drawings in which:

FIG. 2 is an elevational view of a wire positioning support bracket according to the invention;

FIG. 3 is a plan view of the wire positioning support bracket shown in FIG. 2.

Figure 1:
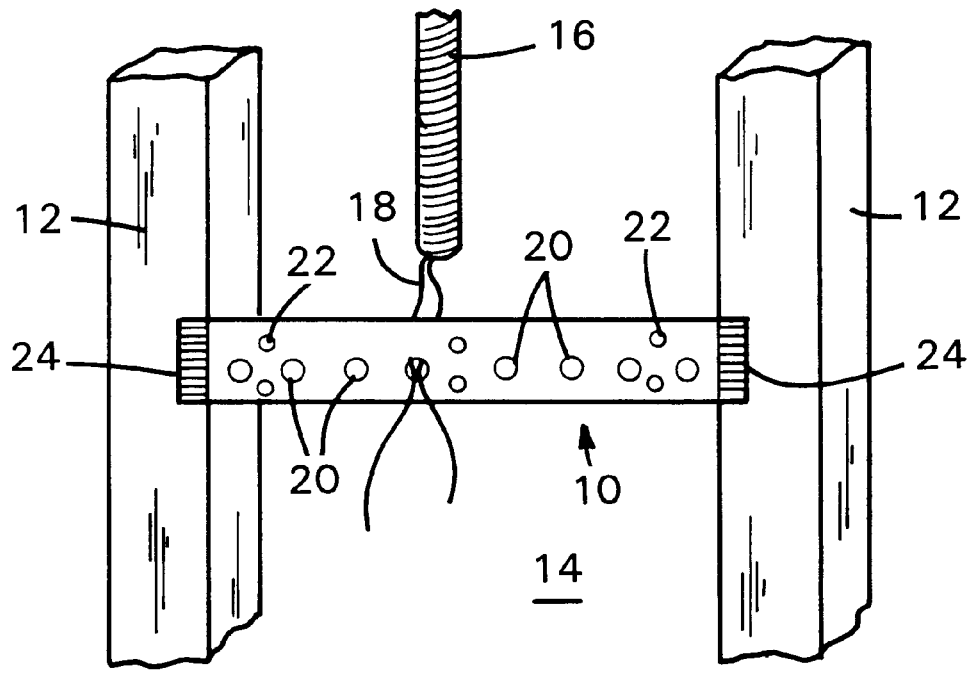
FIG. 1 is a perspective view of a room under construction showing the use of a wire positioning support bracket.

As shown in FIG. 1, the wire positioning support bracket 10 is used to position precisely electrical wiring. Support bracket 10 is affixed, e.g. by nails, between wall support structures (studs) 12 while the room or building is under construction and before the wall elements, e.g. sheetrock panels (not shown), are attached to studs 12. Electrical wire is routed to the desired inter-stud region 14, e.g. through conduit 16. Electrical leads 18 are pulled through one of apertures 20, 22 at the desired location. Cutouts through which electrical connections are to be made are cut in the wall elements at the appropriate location. Then the wall elements are attached to studs 12.

As shown in FIGS. 2 and 3, wire positioning support bracket 10 is essentially an elongated flat planar strip of electrically insulating material, such as plastic or hard rubber, having a width significantly greater than its thickness. Constructing support bracket 10 of electrically insulating material allows locating bare wires or insulated wires whose insulation might fail without danger of the strip introducing an unwanted conductive path between wires.

Mounting surfaces 24 are located at opposite ends 25 of support bracket 10. They are spaced apart by a distance approximately equal to the distance between studs 12 to which support bracket 10 is attached. As shown in FIG. 1, mounting surfaces 24 are attached directly to studs 12. They may be attached easily with nails. To facilitate nailing, and to prevent support bracket 10 from obstructing the attachment of the wall elements to studs 12, ends 25 are preferably somewhat thinner than the body portion 26 of support bracket 10, as shown in FIG. 3. Furthermore, mounting surfaces 24 are preferably striated to better grip studs, such as wooden 2×4's.

Wiring apertures 20, 22 extend transversely through the thickness of support bracket 10. For versatility, two separate sets of wiring apertures are provided. The first set of wiring apertures 20 lie along the longitudinal axis of support bracket 10; the second set of wiring apertures 22, which may be of different diameter than wiring apertures 20 if so desired, lie above and below the longitudinal axis.

It is advantageous to have a number of regularly spaced openings as shown so that the strip may accommodate a desired wire opening along a number of locations between studs. In a specific embodiment of the invention, the length of strip 10 is 17 inches, the width of supports 24 is ¾", there are 8 openings 20 with centers spaced equally between tabs 24, openings 24 are ⅝" in diameter, openings 22 are ¼" in diameter, there are three pairs of openings 22 with diameters spaced equally between the indicated pairs of openings 20, the width of strip 10 is 2½" with openings 20 centered between the lengthwise edges and openings 22 centered along a line ½" from a respective lengthwise edge. The thickness of strip 10 is ⅛" between supports 25 and ¹⁄₁₆" for supports 25. Strip 25 is preferably made of plastic, such as polypropylene.

Figure 4:
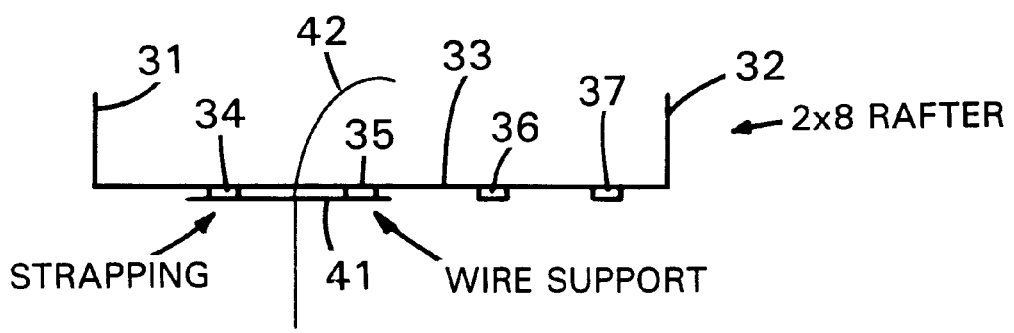
FIG. 4 is a pictorial representation in elevation of an embodiment of the invention for positioning a wire in a ceiling.

The invention may also be used in connection with ceiling installations. Referring to FIG. 4, there is shown a pictorial representation in elevation of an embodiment of the invention for positioning a wire in a ceiling. Rafters 31 and 32 support ceiling 33 carrying strips 34, 35, 36 and 37. A wire support 41 according to the invention may be attached to strips 34 and 35 to position wire 42 as indicated.

The invention may be used, for example, to position 1×4 fluorescent wrap-around fixtures. These fixtures typically have center knockouts that readily be aligned with an opening in wire support 41.

The invention may also be used for positioning numerous other types of wires, such as alarm wires and door chime wires.

According to the method of the invention, positioning an electrical wire includes positioning the strip so that a selected opening in the strip is the desired height above the floor, fastening the supports to adjacent studs, such as by nailing, with the strip thus positioned, and passing the wire through the selected opening at a distance from an adjacent stud corresponding to the desired location of the wire. Wall material is then placed over the region between the strips, and an opening formed in the wall material substantially at the location of the selected opening so that the wire passes through the selected opening and the opening formed in the wall material.

The invention has a number of advantages. It facilitates a quick accurate positioning of wire locations. It safely supports a selected wire in a desired location. It facilitates making openings in wall material at a desired location by relatively unskilled personnel. It saves time in precisely locating wires. The strip may be fabricated in a manner that keeps costs relatively low.

It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein described and limited solely by the spirit and scope of the following claims.

What is claimed is:

1. A wire positioning support bracket for electrical wiring installation between wall support structures separated by a predetermined spacing comprising, an elongated flat planar strip of electrically insulating material having a width significantly greater than its thickness, said strip having mounting surfaces at opposite ends of said strip constructed and arranged for attachment to respective ones of said wall support structures, said mounting surfaces spaced apart by substantially said predetermined spacing, said strip formed with an array of wiring apertures spaced alone the length of said strip, wherein said array of wiring apertures comprises a first set of apertures disposed along a longitudinal axis of said strip, and a second set of apertures disposed on opposite sides of said longitudinal axis.

2. A wire positioning support bracket in accordance with claim 1, wherein the diameters of each of said first set of apertures is a first diameter different from the diameter of each of said second set of apertures which is a second diameter.

3. A wire positioning support bracket in accordance with claim 2, wherein said first diameter is greater than said second diameter.

4. A wire positioning support bracket for electrical wiring installation between wall support structures separated by a predetermined spacing comprising, an elongated flat planar strip of electrically insulating material having a width significantly greater than its thickness, said strip having mounting surfaces at opposite ends of said strip constructed and arranged for attachment to respective ones of said wall support structures, said mounting surfaces spaced apart by substantially said predetermined spacing, said strip, formed with an array of wiring apertures spaced along the length of said strip, wherein the thickness of said mounting surfaces is less than the thickness of that portion of said elongated strip between said mounting surfaces.

5. A wire positioning support bracket for electrical wiring installation between wall support structures separated by a predetermined spacing comprising, an elongated flat planar strip of electrically insulating material having a width significantly greater than its thickness, said strip having mounting surfaces at opposite ends of said strip constructed and arranged for attachment to respective ones of said wall support structures, said mounting surfaces spaced apart by substantially said predetermined spacing, said strip, formed with an array of wiring apertures spaced along the length of said strip, wherein said mounting surfaces are striated.

* * * * *